United States Patent [19]

Burst

[11] Patent Number: 5,197,778
[45] Date of Patent: Mar. 30, 1993

[54] VEHICLE FOLDING TOP

[75] Inventor: Hermann Burst, Rutesheim, Fed. Rep. of Germany

[73] Assignee: Dr. Ing. h.c.F. Porsche AG, Fed. Rep. of Germany

[21] Appl. No.: 843,059

[22] Filed: Mar. 2, 1992

[30] Foreign Application Priority Data

Mar. 2, 1991 [DE] Fed. Rep. of Germany ....... 4106732

[51] Int. Cl.⁵ ................................................. B60J 7/12
[52] U.S. Cl. ..................................... 296/136; 296/128
[58] Field of Search ............... 296/107, 108, 128, 116, 296/117, 136

[56] References Cited

U.S. PATENT DOCUMENTS

| | | | |
|---|---|---|---|
| 2,747,928 | 5/1956 | Olivier | 296/107 |
| 2,845,299 | 7/1958 | Pickering | 296/136 |
| 2,992,042 | 7/1961 | Gilson et al. | 296/136 |
| 3,053,567 | 9/1962 | Geiger | 296/107 |
| 4,746,163 | 5/1988 | Muscat | 296/120.1 |
| 5,035,461 | 7/1991 | Zweigart | 296/107 |
| 5,067,768 | 11/1991 | Fischbach | 296/107 |

FOREIGN PATENT DOCUMENTS 3915867 6/1990 Fed. Rep. of Germany .

Primary Examiner—Robert R. Song
Attorney, Agent, or Firm—Evenson, McKeown, Edwards & Lenahan

[57] ABSTRACT

A vehicle folding top is configured so that, when open, it is deposited in an assigned folding top compartment provided with a hinged compartment lid. At least one device is provided on the folding top compartment lid which, when the hinged compartment lid is closed, supportingly interacts with the folding top structure of the folding top deposited underneath. Thus, on one hand, the overall height of the folding top compartment can be reduced and, on the other hand, clattering noises of the deposited folding top during the driving operation are avoided.

15 Claims, 3 Drawing Sheets

VEHICLE FOLDING TOP

BACKGROUND AND SUMMARY OF THE INVENTION

The present invention relates to a vehicle folding top which, when the top is open, is deposited in an assigned folding top compartment which is provided with a hinged compartment lid.

A folding top is shown in German Patent DE 39 15 867 C1. When that top is open, it is disposed in the top compartment in a loosely folded fashion and requires a relatively large overall height because, viewed in the vertical direction, the distance between the folding top and the compartment lid must amount to approximately 20 mm in order to avoid a chafing between the sealing devices of the folding top and the folding top compartment lid. During driving, when the folding top is open, inherent movements of the folding top occur in the folding top compartment which result in rattling noises.

It is an object of the present invention to provide with respect to a folding top housed in a folding top compartment that, on one hand, the overall height of the folding top compartment can be reduced and that, on the other hand, rattling noises of the deposited folding top during the driving operation as well as chafing movements between the sealing devices of the folding top and the folding top lid are largely avoided.

This object has been achieved in accordance with the present invention by arranging at least one device on the folding top compartment lid which, when the folding top lid is closed, interacts in a supporting manner with a folding top structure of the deposited folding top disposed below.

Among the principal advantages achieved by the present invention are that, by way of the arrangement of the at least one device on the folding top compartment lid, a forced compressing or clamping of the folding top takes place in the top compartment via the folding top compartment lid. Consequently, no relative movements are permitted between the folding top and the folding top compartment lid, and rattling noises are therefore avoided. In addition, the overall height of the folding top compartment can be reduced because the inherent movements of the folding top are reduced and, in addition, the folding top is compressed further. With the arrangement of at least one device on the folding top compartment lid, it is sufficient for a constructional gap of approximately 5 mm to be provided between the folding top and the folding top compartment lid.

The devices can be formed by pressure elements which are easy to produce and which preferably are adjustably fastened on the folding top compartment lid or on its hinge. By virtue of the lever effect of the provided devices, high pressure forces are produced on the folding top, and thus the devices operate as hold-down devices.

BRIEF DESCRIPTION OF THE DRAWINGS

These and other objects, features and advantages of the present invention will become more apparent from the following detailed description of a presently preferred embodiment when taken in conjunction with the accompanying drawings wherein.

DETAILED DESCRIPTION OF THE DRAWINGS

Figure 1:
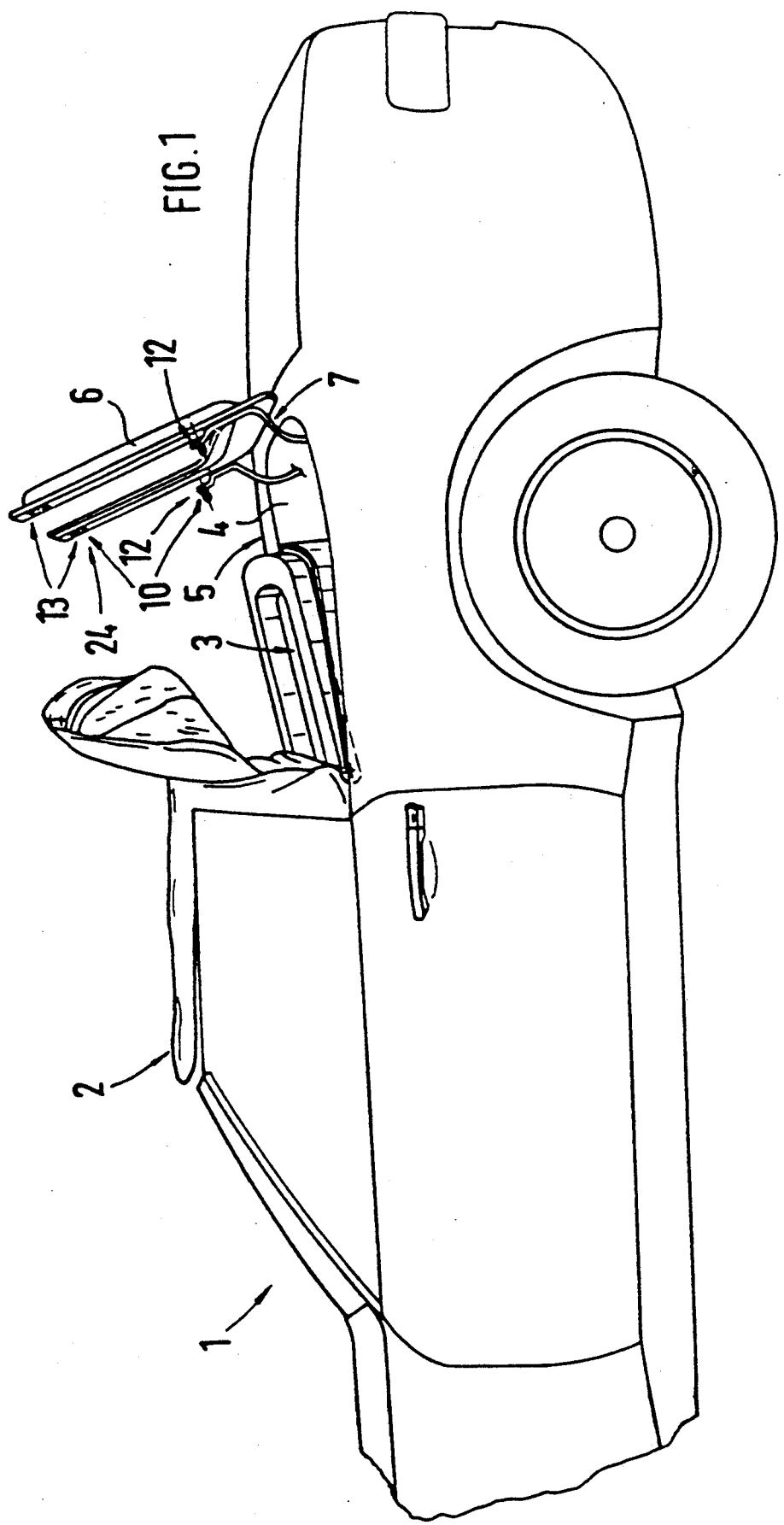
FIG. 1 is a perspective lateral view of a convertible with a folding top and a folding top compartment having a folding top compartment lid in accordance with the present invention.

A convertible 1 has a folding top 2 which, when the vehicle top is to be open, can be lowered into a vehicle body folding top compartment 4 surrounding a rear seat area 3 in a U-shape. The folding top compartment 4 has an upwardly facing opening 5 which can be covered by a folding top compartment lid 6 hingedly arranged on the vehicle body behind the folding top compartment 4. For this purpose, as viewed in the transverse direction, two spaced lifting hinge arms 7 are provided on the interior side of the folding top compartment lid 6. An end area 8 (FIG. 2) of the hinge arms 7 is fixedly connected with the compartment lid 6. The other end area of the hinge arm 7 is rotatably arranged on an adjacent cross member 9 of the vehicle body in a conventional manner not shown in detail.

In order house the folding top 2 in the folding top compartment 4 in a space-saving manner (i.e., with low overall height of the folding top compartment 4) and to avoid rattling noises when driving with the roof open, at least one device 10 is provided on the folding top compartment lid 6 which, when the folding top compartment lid 6 is closed, supportingly interacts with a folding top structure 11 of the folding top 2 disposed therebelow. That is, by way of the device 10, the folding top 2 is forcedly compressed farther downward and is, at the same time, clamped. As a result, inherent movements of the folded-together folding top 2 are largely avoided.

The device 10 is formed by at least one pressure element 12, 13 facing the deposited folding top 2 which, when the compartment lid 6 is closed, is in an operative connection with an aligned longitudinally or transversely extending frame part of the folding top structure 11.

In the embodiment shown in FIG. 1, a lower pair 12 and an upper pair 13 of spaced pressure elements are provided on the compartment lid 6 which, when the folding top compartment lid 6 is closed, press down on the folding top 2 and clamp it at the same time. According to FIGS. 1 and 2, two pressure elements 12 are mounted on a rearward edge area 14 of the folding top compartment lid 6, which, are transversely spaced with respect to one another and when the compartment lid 6 is closed, press against a transversely extending frame part 15 of the folding top structure 11 disposed underneath.

Figure 2:
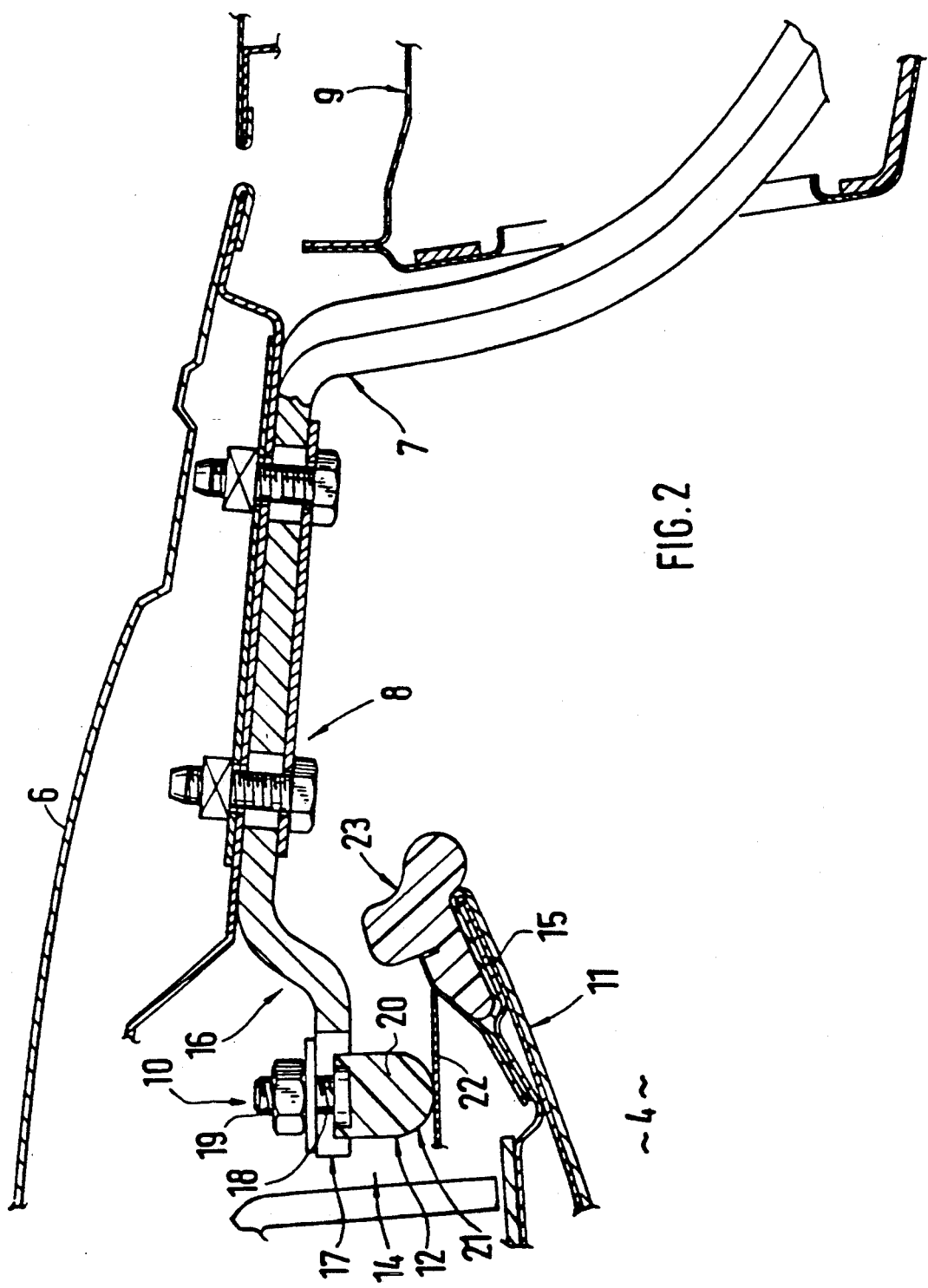
FIG. 2 is a central longitudinal sectional view of a hinge arm of the folding top compartment lid shown in FIG. 1 with a partial area of the deposited folding top.

In FIG. 2, the rear pressure elements 12 are each fastened to the hinge arm 7 of the compartment lid 6. For this purpose, each hinge arm 7 has a downwardly directed step-shaped molded-on part 16 on its end facing the folding top compartment lid 6. An assigned pressure element 12 is thus held in position at this molded on part 16. On an approximately horizontal web 17 of the molded-on part 16, a stepped bore 18 is provided for receiving a pin-shaped fastening section 19 of the pressure element 12. An external thread of the fastening section 19 is screwed into an internal thread of the bore 18. A washer and a lock nut are applied to the upwardly projecting end of the fastening section 19. The pressure element 12 surrounds a buffer section 20 below the web 17, which buffer section has a cylindrical construction, a rectangular solid shape, or the like. The buffer section 20 made of a suitable plastic material or of a hard rubber, and is connected to the fastening section 19, for example, by vulcanizing. The area 21 of the buffer section 20, which interacts with the frame part 15 of the folding top structure 11, has a spherical cap shape in the illustrated embodiment, although other shapes can be used without departing from the scope of the present invention.

The pressure element 12 is constructed to be adjustable in the vertical direction (i.e., in the direction of the deposited folding top 2) by way of the lock nut so that installing and manufacturing tolerances can be compensated and a perfect functioning of the pressure element 12 is always ensured.

According to FIG. 2, the area 21 of the buffer section 20, which has a spherical cap shape, is supported on a holding strip 22 for a sealing device 23 of the forward frame part 15. The possibility also exists, however, for the pressure element 12 to be supported directly on the folding top structure 11.

Furthermore, two additional pressure elements 13 are mounted in a forward or upper section 24 of the folding top compartment lid 6 which, when the folding top compartment lid 6 is closed, interact with longitudinally extending frame parts of the folding top structure 11 which are not shown in detail.

Figure 3:
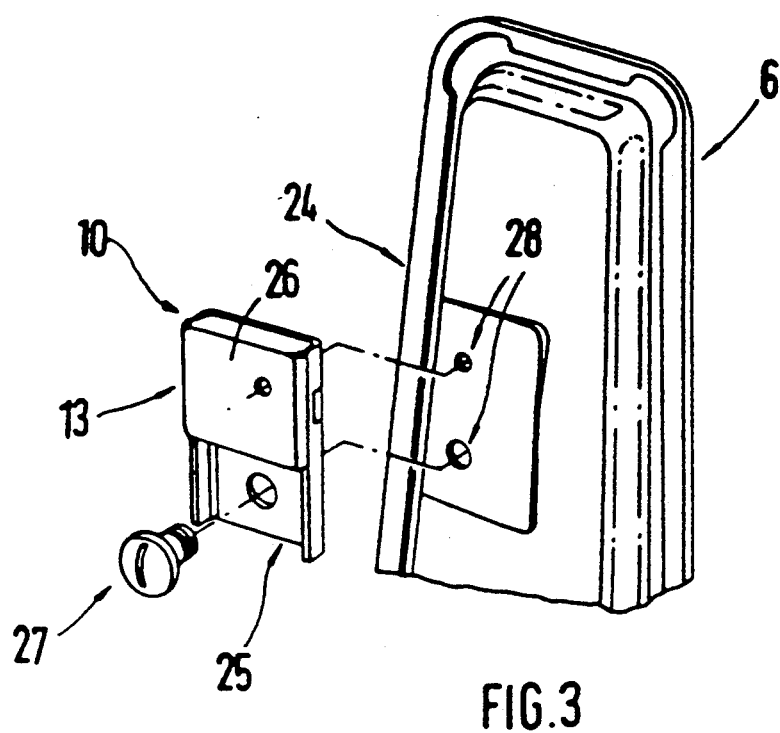
FIG. 3 is a view of a front end area of the folding top compartment lid shown in FIG. 1 with a pressure element.

According to FIG. 3, these pressure elements 13 also act as hold-down devices and have a different shape than the rearward or lower pressure elements 12. The forward pressure elements 13 are formed of a holding plate 25 fastened to the interior side of the folding top compartment lid 6 and locally carries a plate or hard rubber supporting body 26. The supporting body 26 is fixedly connected with the holding plate 25 which has an approximately U-shaped profile.

For the fastening of the forward pressure element 13, two fastening screws 27, respectively, can be screwed into threaded receiving devices 28 of the folding top compartment lid 6. In the top view, the forward pressure elements 13 have an approximately square or rectangular shape, with the overall height being dimensioned such that the pressure elements 13 rest under prestress against the frame sections or sealing sections of the folding top structure 11 disposed below. It is, of course, also possible for the device 10 or the pressure elements 12, 13 to be mounted on the folding top 2, thereby reversing the operating principle but not departing from the underlying principles of the present invention.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A vehicle folding top configured to be deposited in an assigned folding top compartment of a vehicle when the top is open, comprising a hinged folding top compartment lid operatively associated with the compartment, wherein, at least one device operatively arranged on the folding top compartment lid which, when the folding top compartment lid is closed, supportingly interacts with a folding top structure of the folding top in a deposited position disposed therebelow.

2. The folding top according to claim 1, wherein the at least one device is formed by a pressure element which, when the folding top compartment lid is closed, is in an operative connection with an aligned extending frame part of the folding top structure.

3. The folding top according to claim 1, wherein, on a rearward edge area of the folding top compartment lid, two pressure elements are provided which, viewed in a transverse vehicle direction, are spaced each other and which, when the folding top compartment lid is closed, press against a transversely extending frame part of the folding top structure disposed underneath.

4. The folding top according to claim 3, wherein the at least one device is formed by a pressure element which, when the folding top compartment lid is closed, is in an operative connection with an aligned extending frame part of the folding top structure.

5. The folding top according to claim 2, wherein the pressure elements are configured to be adjustable in the direction of the deposited folding top 6. The folding top according to claim 5, wherein, on a rearward edge area of the folding top compartment lid, two pressure elements are provided which, viewed in a transverse vehicle direction, are spaced each other and which, when the folding top compartment lid is closed, press against a transversely extending frame part of the folding top structure disposed underneath.

7. The folding top according to claim 2, wherein the pressure elements are fastened to a hinge arm of the folding top compartment lid.

8. The folding top according to claim 7, wherein, on a rearward edge area of the folding top compartment lid, two pressure elements are provided which, viewed in a transverse vehicle direction, are spaced from each other and which, when the folding top compartment lid is closed, press against a transversely extending frame part of the folding top structure disposed underneath.

9. The folding top according to claim 2, wherein each pressure element comprises a pin-shaped fastening section and a connecting buffer section, the buffer section being configured in a spherical cap shape on an end area facing the folding top.

10. The folding top according to claim 9, wherein, on a rearward edge area of the folding top compartment lid, two pressure elements are provided which, viewed in a transverse vehicle direction, are spaced each other and which, when the folding top compartment lid is closed, press against a transversely extending frame part of the folding top structure disposed underneath.

11. The folding top according to claim 9, wherein the buffer section comprises one of a suitable plastic material and hard rubber.

12. The folding top according to claim 7, wherein each hinge arm of the folding top compartment lid, on an end facing the folding top compartment lid, has a downwardly directed step-shaped molded-on piece on which the pressure element is adjustably fastened.

13. The folding top according to claim 12, wherein each pressure element comprises a pin-shaped fastening section and a connecting buffer section, the buffer section being configured in a spherical cap shape on an end area facing the folding top.

14. The folding top according to claim 1, wherein additional pressure elements are mounted on a forward section of the folding top compartment lid which, when the folding top compartment lid is closed, press against a longitudinally extending frame parts of the folding top structure.

15. The folding top according to claim 14, wherein the additional, forward mounted pressure elements are screwed directly to the interior side of the folding top compartment lid, and each of the forward pressure elements comprises a holding plate with an approximately U-shaped profile and an inserted, downwardly projecting supporting body of one of plastic and hard rubber.

* * * * *